United States Patent

Masuda

[15] 3,684,997

[45] Aug. 15, 1972

[54] HALL EFFECT DEVICE HAVING AN OUTPUT VOLTAGE OF THE NTH POWER CHARACTERISTICS WITH MAGNETIC INDUCTION

[72] Inventor: Noboru Masuda, Tokyo, Japan

[73] Assignee: Denki Onkyo Co., Ltd., Tokyo, Japan

[22] Filed: Sept. 5, 1969

[21] Appl. No.: 855,615

[30] Foreign Application Priority Data

Sept. 14, 1968 Japan ......................43/65985

[52] U.S. Cl. ....................338/32 H, 323/94 H, 330/6

[51] Int. Cl. ..............................................H01c 7/16

[58] Field of Search ..................330/6; 307/309, 278; 338/3.2 H; 317/235, 23; 324/45, 46, 117 H; 323/94 H

[56] References Cited

UNITED STATES PATENTS 3,340,467 9/1967 In Whan Ho ............324/45 X

FOREIGN PATENTS OR APPLICATIONS 1,144,155 3/1969 Great Britain.........317/235 H

*Primary Examiner*—Benjamin A. Borchelt
*Assistant Examiner*—R. Kinsberg
*Attorney*—McGlew and Toren

[57] ABSTRACT

In the disclosed Hall effect devices a Hall generator section energized by a source has a second Hall generator section formed by elongating the first section at the location of the output terminal. The second Hall generator section includes two output terminals. One of the input terminals of the second Hall generator section is an integral extension of the output terminal of the first Hall generator section. Suitable circuit means connect the other input terminal of the second Hall generator section to the other output terminal of the first Hall generator section. Successive Hall generator sections can be formed by elongating the material of the preceding Hall generator sections at one of the output terminals of the preceding Hall generator section and connecting the extreme newly formed input terminal of the successive section to the other output terminal of the preceding section. The same magnetic field is applied to all the sections. The voltage at the output terminals of the last section is a function of the power of the magnetic field equal to the number of sections. One or more thermistors having temperature characteristics opposed to those of the section may be added in series with the input terminals of the section. Suitable magnetic resistances may be added in feedback relationship to the output of the final section to promote linearity of the output.

18 Claims, 7 Drawing Figures

INVENTOR.
NOBORU MASUDA

BY McGlew and Toren
ATTORNEYS

INVENTOR.
NOBORU MASUDA
BY McGlew and Toren
ATTORNEYS

INVENTOR.
NOBORU MASUDA
BY McGlew and Toren
ATTORNEYS

INVENTOR
NOBORU MASUDA
BY
Toren - McGeady
Attorneys

HALL EFFECT DEVICE HAVING AN OUTPUT VOLTAGE OF THE NTH POWER CHARACTERISTICS WITH MAGNETIC INDUCTION

SUMMARY OF THE INVENTION

The present invention relates to a Hall effect device having an output voltage corresponding to the *n*th power characteristics of the applied magnetic induction.

In known systems an output voltage having an *n*th power characteristics of an applied magnetic induction, is produced by arranging four-terminal Hall effect devices, equal in number to the exponent serially between a power supply and a measuring instrument, while at the same time sequentially connecting the output terminals of the devices on the power supply side with the input terminals of the devices on the load side via amplifiers. Thus the output voltage of the devices on the power supply side is sequentially impressed on the input terminals of the load side. Therefore, the output voltage of the final device, i.e., the device connected to the load, exibits an characteristic or function of the *n*th power magnetic induction.

Such means, however, are subject to unavoidable disadvantages. They suffer from lack of uniformity in the characteristies of the devices arising from unevenness in the quality of materials for the devices and the lack of uniformity in the output voltage characteristics because of the interpositioning of amplifiers. These result in discrepancies in the ultimate output voltage characteristics. Other defects include the lack of uniformity in the magnetic field applied to the separate devices since they were separated, and high cost of production engendered by the interpositioning of amplifiers.

It is an object of the present invention to avoid the above-mentioned disadvantages by providing an apparatus having an output voltage corresponding to the *n*th power characteristics of the magnetic induction.

It is another object to improve the characteristics of the output voltage relative to the magnetic induction through linearity compensation of the output voltage characteristics of the above-mentioned discrete devices.

According to a feature of the present invention, these objects are attained by a unitary Hall effect device having a first Hall generator section connected to a power supply and a second generator section made by elongating and shaping one side of the output terminal section of the first section and forming *n* number of generator sections sequentially by elongation and shaping of one output terminal of each sequential section. According to another feature of the invention linearity compensation of the output voltage characteristics of the overall device is achieved with a magnetoresistance.

BRIEF DESCRIPTION OF THE DRAWINGS

The present invention will be clarified by the descriptions presented in the following, which give details of the attached drawings.

DETAILED DESCRIPTION OF PREFERRED EMBODIMENTS

Figures 1, 2:
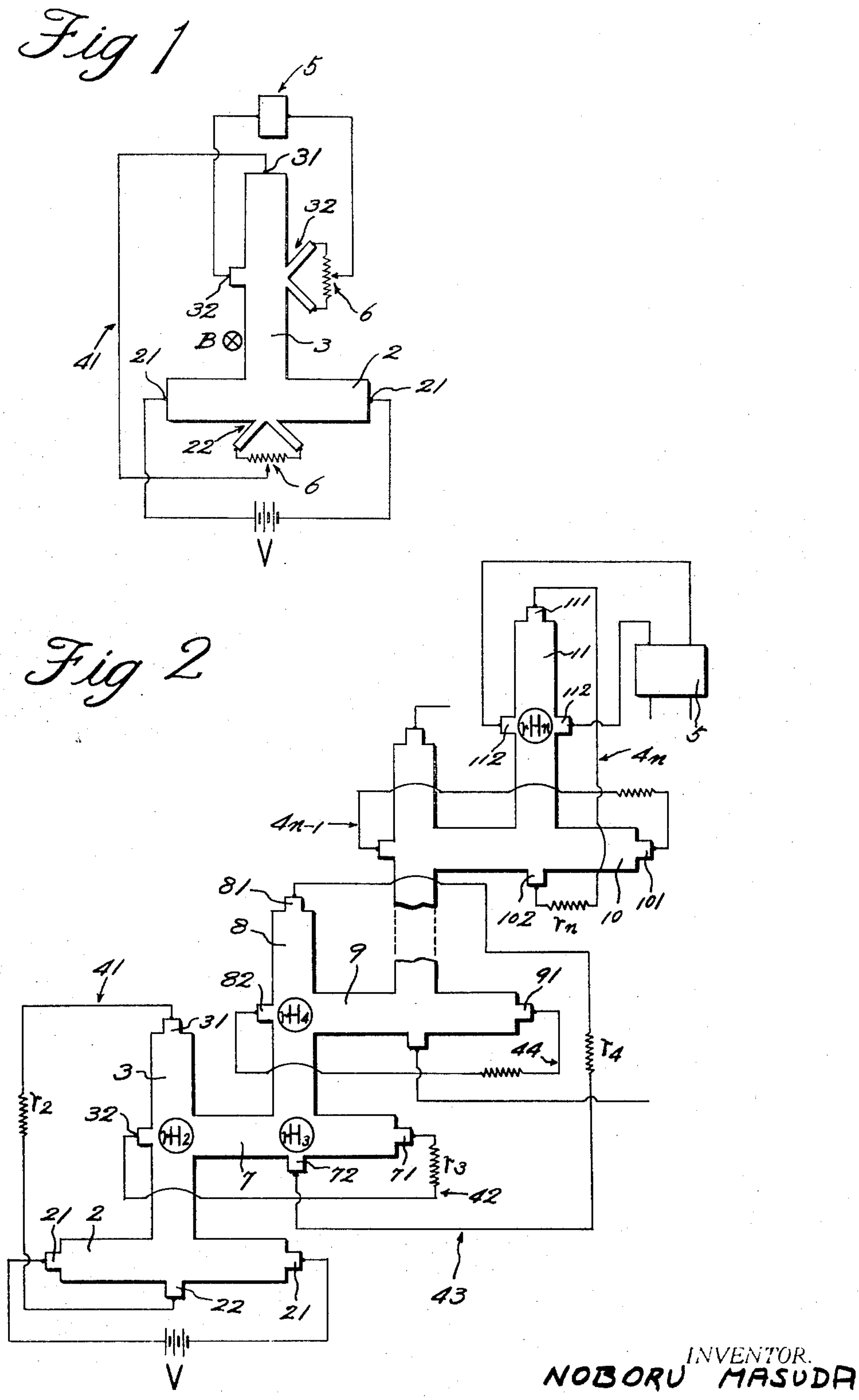
FIG. 1 1 is a diagram of an embodiment of the Hall effect device of the present invention constructed to produce an output that is a function of the square of the magnetic induction.
FIG. 2 is a diagram of an embodiment of the Hall effect device of the present invention made so as to produce an output that is a function of the *n*th power of the magnetic induction.

In FIG. 1, a Hall effect device is composed of the first Hall generator section 2 with input terminals 21 connected to a power source V and the second Hall generator section 3 made by elongating and shaping part of the output terminal section of the first section.

The extended terminal 31 of the second section is connected with the output terminal 22 of the first section by means of the external resistance circuit 41 so that the primary Hall output voltage $VH_1$ generated on the first section with the power supply current $i_1$ and the magnetic induction B applied to the device will be impressed on the second section 3.

The output terminals 32 of the second section, connected to the load 5, establish the secondary Hall output voltage $VH_2$ generated on the second section by means of the current $i_2$ which flows in the second section 3 upon occurrence of the voltage VH1 in the first section when the magnetic field is applied to the device.

The output terminal 22 of the above-mentioned first section and the output terminals 32.32 of the above-mentioned second device section may be shaped into a single protruding strip, but if it is forked as shown in the figure, it will be convenient to adjust the unbalanced voltage since the resistance of the terminal section can be adjusted by potentiometer 6.

The output voltage characteristics of the Hall effect device shown in FIG. 1 is as follows:

If the product sensitivity of the device is designated as $K$, the Hall current as $i$, the magnetic induction as $B$ and the unbalance voltage coefficient as $K'$, the output voltage $VH$ of a Hall effect generator is generally $$VH=i\,(KB+K') \qquad (1)$$

Consequently, if the primary current is designated as $i_1$, the product sensitivity of the first section as $K_1$, the magnetic induction as B and the unbalance voltage coefficient of the first section as $K'_1$, the primary Hall potential output voltage of the first section of the present device becomes $$VH_1 = i_1 (K_1B + K'_1) \quad (2)$$

Consequently, if the current flowing through the second device section is designated as $i_2$, the product sensitivity of the second device section as $K_2$, the magnetic induction as $B$ and the unbalance voltage coefficient as $K'_2$, the output voltage $VH_2$ from the second section becomes $$VH_2 = i_2 ( K_2B + K'_2) \quad (3)$$

If the internal resistance of the second section is designated as $rH_2$ and the resistance of the external resistance circuit as $R_2$, $$i_2 = VH_1/(rH_2 + R_2) \quad (4)$$

From equations (2), (3) and (4) therefore, $$VH_2 = i_1 (K_1B + K'_1) (K_2B + K'_2)/(rH_2 = R_2) \quad (5)$$

And since the unbalance voltage coefficient $K'_1$ may be zero, $$VH_2 = i_1 B^2 K_1 K_2/(rH_2 = R_2) \quad (6)$$

Consequently, the fact that the output voltage $VH_2$ of the second device section has the square characteristics with the magnetic induction B is demonstrated.

Referring to FIG. 2, there is shown a Hall effect device having n Hall generator sections which generate an output voltage which is a function of the $n$th power of the applied magnetic induction B. The power supply V is connected between the input terminals 21 of the first section 2.

The second Hall generator section 3 is made by elongating and shaping one side of the output terminal section of the above-mentioned first section which is used as the base Hall generator section. As the other output terminal 22 of the first section and the extended output terminal 31 of the second section are connected by means of an external resistance circuit 41, the primary Hall output voltage generated on the first generator section by the primary generator current $i_1$ and the magnetic field applied to the device is impressed on the second section 3.

A third Hall generator section 7 is made by elongating and shaping one side of the output terminal of the above-mentioned second section, which is used as the base section. The other output terminal 32 of the second section and the extended output terminal 71 of the third Hall generator section 7 are connected by means of the external resistance circuit 42. Thus, the secondary Hall output voltage $VH_2$ generated on the second section by the current $i_2$ that flows under the influence of the primary Hall output voltage $VH_1$ impressed on the second section, and the magnetic field applied to the device are impressed on the third Hall generator section.

A fourth Hall generator section 8 is made by elongating and shaping one side of the above-mentioned third section 7 used as the base section.

The other output terminal 72 of the third section and the extended output terminal 81 of the fourth section are connected by means of the external resistance circuit 43. Thus, the tertiary Hall output voltage $VH_3$, generated on the third section by the current $i_3$ that flows under the influence of the secondary Hall output voltage $VH_2$ impressed on the third section when the magnetic field applied to the device, is impressed on the fourth section.

The fifth section 9 to the ($n$−1)th Hall Generator section 10are made, as in the above cases, by elongating and shaping one side of the output terminal section of the preceding Hall generator section used as the base section. Also, the extended output terminals 91–101 of the various Hall generator sections and the output terminal 82 of the other side of the base section obtained by division are connected to each other with external resistance circuits 44 . . . 4$n$−1, as above. Thus, the biquadratic Hall output voltages $VH_4$ . . . $n$-secondary Hall output voltage $VH_{n-2}$ generated on the base device sections are impressed on the various Hall generator sections.

The $n$th device section 11 is made by elongating and shaping one side of the output terminal of $n$th-1 Hall generator section 10.

The extended output terminal 111 of the $n$th Hall generator section are connected by means of the external resistance circuit 4$n$. Thus, the $n$−1 Hall output voltage $VH_{n-1}$ generated on the $n$−1 device section 10 by the current $i_{n-1}$ that flows under the influence of $n$secondary Hall output voltage $VH_{n-2}$ impressed on the $n$−1 device section and the magnetic field applied to the device is impressed on the nth device section.

Between the output terminals 112 of the nth device section 11 is connected load 5. According to one embodiment of the invention, the load 5 is a logic amplifier or a boost up amplifier. The nth Hall output voltage $VH_n$ generated on the nth device section is impressed on the load 5.

Here, if the product sensitivities of the various Hall generator sections from the third to nth device sections are designated as $K_3, K_4 \ldots . K_n$ respectively, the internal resistances of the various device sections from the third to the nth as $rH_3, rH_4 \ldots . rH_n$ and the various resistances of the external resistance circuits as $R_3, R_4 \ldots . R_n$, the nth Hall output voltage $VH_n$, from equations (1), (2), (3), (4), (5) and (6), would be $$VH_n = i_1 \cdot B^n \cdot (K_1 K_2 \ldots K_n)/(rH_2 + R_2) \cdot (rH_3 + R_3) \cdot (rH_4 + R_4) \ldots (rH_n + R_n) \quad (7)$$

which demonstrates the fact that the output voltage $VH_n$ has the $n$th characteristics with the magnetic induction.

As can be seen from the above description, the Hall effect devices shown in FIGS. 1 and 2, while being discrete devices have plural Hall generator sections corresponding in number to the exponents. With these, disadvantages such as mentioned before can be eliminated. However, since the Hall effect devices, as is widely known, decrease their output voltage with increase with the temperature, it is necessary to provide means of temperature compensation in order to make the ultimate output voltage characteristics linear.

Figure 3:
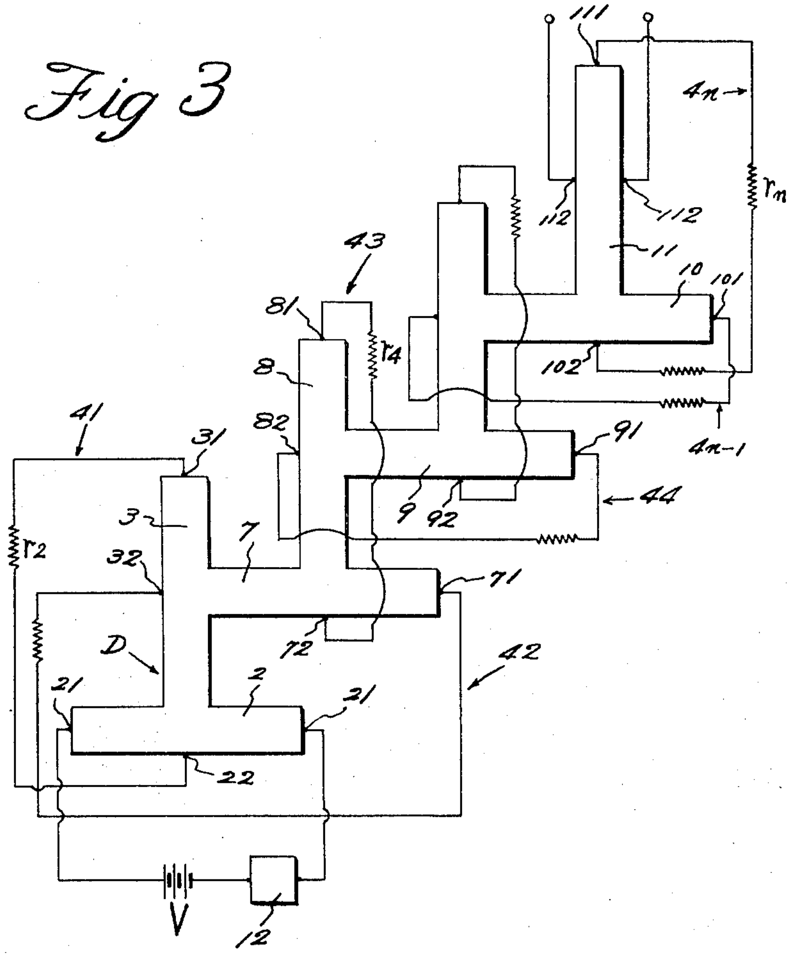
FIG. 3 is a diagram of a Hall effect embodying features of the present invention and utilizing a thermistor as a means of temperature compensation.

In FIG. 3, the Hall effect device D of the present invention using thermistor 12 as the means of above-mentioned temperature compensation is shown.

The above-mentioned thermistor 12 is connected in series to the input terminal 21 of the first device section 2. Its temperature coefficient P has been selected so as to have a relation of $P = e^{-n \, t}$ relative to the temperature coefficient − T of the above-mentioned first section and the number of Hall generator sections n and the base e (approx. 2.718 in numerical value) of natural logarithms.

When the secondary Hall output voltage $VH_2$ impressed on the third generator section is considered, $$VH_2 = i_2 ( R_2 + RH_2 ) \quad (8)$$

$$i_2 = VH_1/R_2 + rH_2 \quad (9)$$

From the aforementioned equations (1), (2), (3), (4), (5), (6), (7), (8) and (9), therefore, $$VH_2 = i_1 K_1 K_2 B_2 e^{-2\alpha t}/(R_2 + rH_2) \quad (10)$$

Consequently, in the present embodiment of application, the ultimate output voltage $VH_n$ can be obtained with the following equaion:

$$VH_n = i_1 \cdot (R_2 \cdot R_3 \cdot R_4 \ldots R_n) \cdot (K_1 \cdot K_2 \cdot K_3 \ldots K_n) B^n{}_e{}^{-n\ T} / (rH_2 + R_2) \cdot (rH_3 + R_3) \cdot (rH_4 + R_4) \ldots (rH_n + R_n) \quad (11)$$

As is clear from the above equation, a Hall effect device decrease its output voltage $VH_n$ with increase in temperature. If, therefore, a constant voltage source is used as power supply for the device and a theremistor is connected in series across the input terminals of the device and the source and if the temperature coefficient of the thermistor is controlled according to $P = e^{-n\ T}$ as aforementioned, the internal resistance of the thermistor will decrease as the temperature increases and the primary Hall generator current $i_1$ will increase to offset drop in the output voltage $VH_n$ of the device D. This compensates a drop in the output voltage $VH_n$ caused by increase in temperature.

Here $i_1$ is the power supply current; $R_2$ is the resistance of the external resistance circuit 41, which impresses the primary Hall output voltage on the second Hall generator section 3 and which includes the resistance of copper wire and the compensated resistance $r_2$; $R_3, R_4 \ldots R_n$ are respectively resistances of the external resistance circuits 42, 43 . . . 4$_n$ of the third device section 7, fourth Hall generator section 8 . . . nth device section, including the resistance of the copper wire and the compensated resistance $r_3, r_4 \ldots r_n$; $K_1, K_2, K_3 \ldots K_n$ are product sensitivities of the first section, second section, third device section...nth section; B is the magnetic induction and $rH_2, rH_3, rH_4 \ldots rH_n$ are internal resistances of respective sections.

Figure 7:
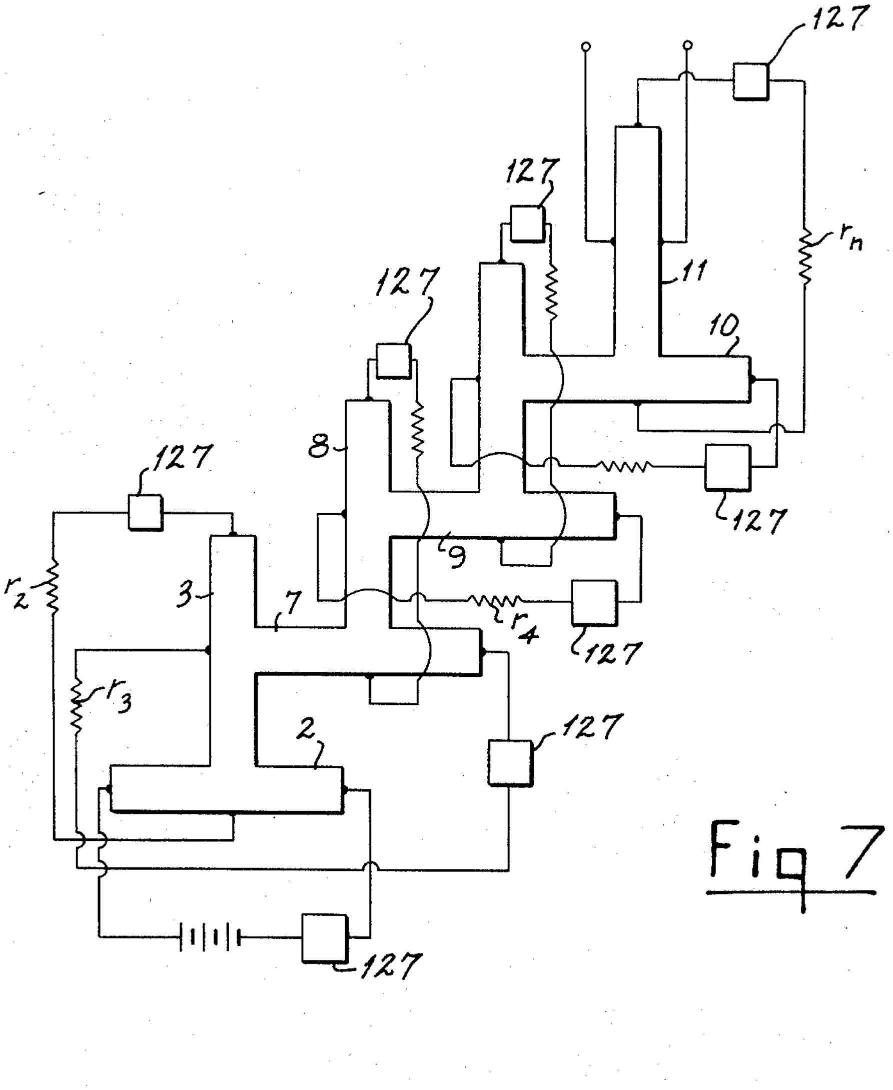
FIG. 7 is a schematic diagram of another device embodying features of the invention and including temperature compensation.

While the above-mentioned thermistor was shown in the embodiment as being connected in series with the first section, it may be attached to each of the sections. In that case a thermistor having a temperature coefficient of $P = e^{-n\ T}$ is inserted in series with each input terminal of each section. This is shown in FIG. 7.

As is clear from the foregoing equations, the value of the output voltage $VH_n$ is largely dependent upon the internal resistances $rH_2 \ldots rH_n$ of various Hall generator sections. But since the internal resistances of Hall generator sections increase along with increase in the magnetic induction, the linearity of the output voltage $VH_n$ is lost thereby.

Figure 4:
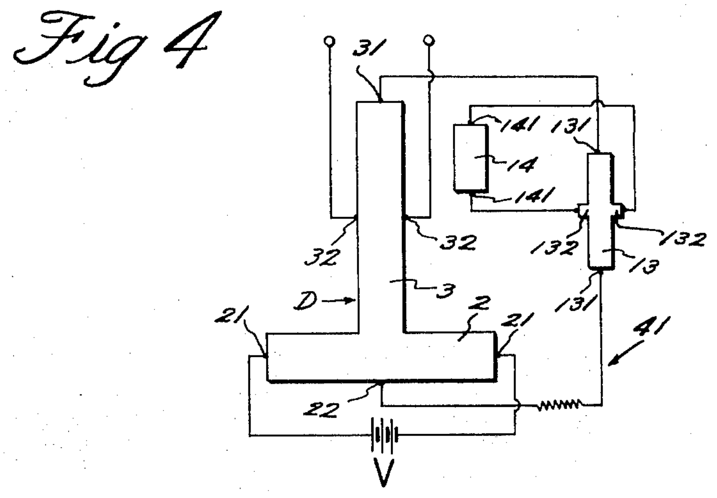
FIG. 4 is a diagram of the a Hall effect device embodying features of the present invention and utilizing a Hall effect device and a magnetoresistance device as a means of linearity compensation.

FIG. 4 shows an embodiment of the above-mentioned Hall effect device constructed so as to compensate for the non-linearity of such ultimate output voltage $VH_n$.

In FIG. 4, a Hall effect device D having the first Hall generator and the second section 3 is shown as an embodiment, but the number of Hall generator sections may be selected optionally, there being no reason for limiting the Hall effect device to that of squared characteristics as shown in the figure.

FIG. 4 shows a means of compensation, wherein a four-terminal Hall effect device 13 is inserted for compensation in series with the external resistance circuit 41. The latter impresses the primary Hall output voltage $VH_1$ of the first section 2 on the second section 3. Thus, current $i_2$, which flows under the influence of the above-mentioned primary Hall output potential, will be applied to the device between input terminals 131 as an input current at the same time the input terminals 141 of a magenotosesistance device 14 are connected between the output terminals 132 of the above-mentioned compensating Hall effect device 13.

It is necessary to position the above-mentioned magnetoresistance device in the same magnetic field as the Hall effect device D of the present invention. Also, the above-mentioned compensating Hall effect device 13 may be positioned in the same magnetic field as the Hall effect device D of the present invention. However, in order to obtain definite compensating action, it is desirable to position the compensating Hall effect device 13 in a magnetic field of constant magnetic flux density.

In the present embodiment of application, when the magnetic flux applied to the Hall effect device D of the present invention increases, the internal resistance of the magnetoresistance device 14, which receives the magnetic flux, also increases, rendering the input resistance of the compensating device 13, i.e., the internal resistance to current $i_1$, into negative resistance. In other words, the resistance to the input current of the compensating device 13 decreases.

Consequently, while current $i_2$ supplied to the second section 3 increases as the magnetic flux density increases and the internal resistance of the second section intensifies, it also decreases when the magnetic flux density attenuates and the internal resistance of the second device section decreases, thus giving linearity to the output characteristics of the ultimate output voltage $VH_2$.

In the present embodiment of application, it is most effective to attach the above-mentioned compensating Hall effect device 13 and the magnetoresistence device 14 for each section. However, in order to economize on the cost of production, they may just as well be attached to the final device section. In either case, the negative resistance$\Delta r(B)$ of the compensating Hall effect device 13 and the increased portion of the resistance, i.e., the increased portion of internal resistance$\Delta rH(B)$ of the second Hall generator section or from the second section to the $n$th section, which affects the ultimate output voltage $VH_n$ should be selected so has to have a relationship of $$\Delta rH(\mathrm{B}) - \Delta r(\mathrm{B}) = 0$$

In other words the variation rate of the negative resistance $r(\mathrm{B})$ of the above-mentioned compensating Hall effect should be equal and opposite to the variation rate of the internal resistance $rH(\mathrm{B})$ of the Hall effect device of the present invention.

In this case, though resistance variations with the magnetic induction of the first section will affect the primary device current $i_1$, this may practically be ignored if a constant current power supply is used. It is, therefore, not necessary to especially provide a compensating means.

In the present embodiment of application, means of affording linearity to the ultimate output voltage characteristics by utilizing the negative resistance of the compensating Hall effect device 13 have been described. However, the means described below may also be used for linearity compensation of the ultimate output voltage characteristics.

Figure 5:
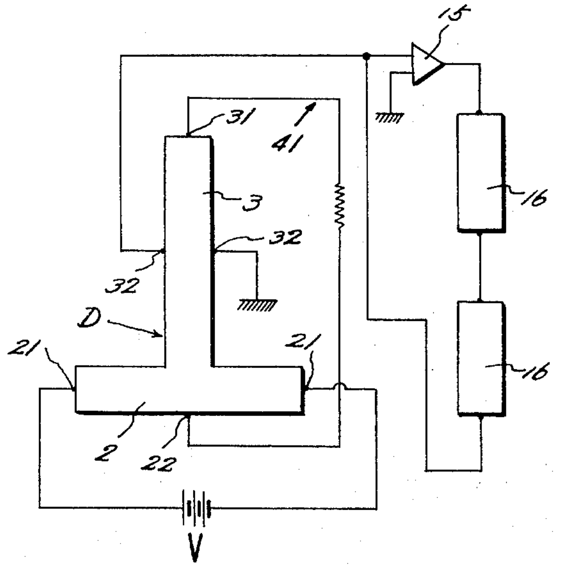
FIG. 5 is a diagram of the Hall effect device embodying features of the present invention and utilizing two magnetoresistance devices as a means of linearity compensation.
Figure 6:
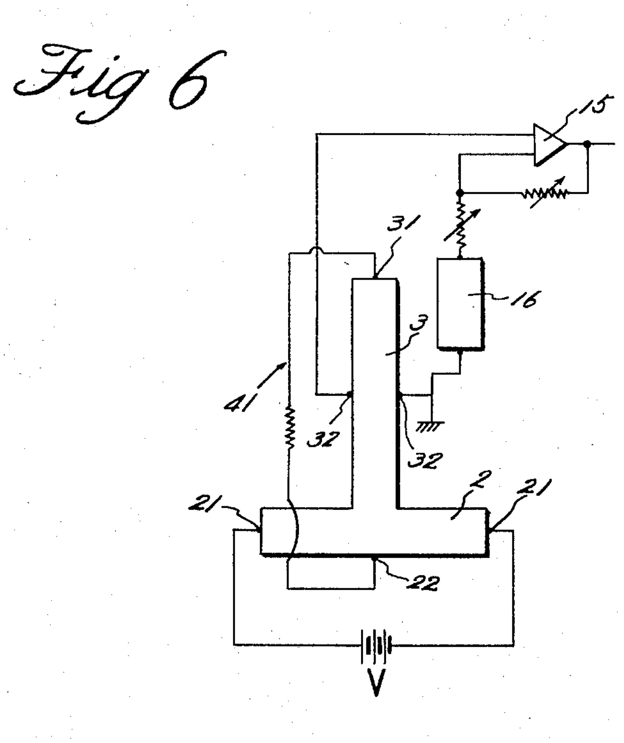
FIG. 6 is a diagram of the Hall effect device embodying features of the present invention and utilizing a magnetoresistance device as means of linearity compensation.

FIGS. 5 and 6 show a means of compensation wherein a balancing type amplifier 15 is connected between final output terminals 32 of the Hall effect device D of the present invention. The second power characteristic Hall effect device has the first section 2 and the second section 3 and the magnetoresistance device 16 connected as a feedback resistor to the feedback circuit of the amplifier system.

The embodiment of application illustrated in FIG. 5 represents two magnetoresistance devices 16 inserted in series with the amplifier between the position input terminal of the amplifier and the output terminal of the Hall effect device D. The above-mentioned magnetoresistance effect devices 16 are to be positioned in the same magnetic field as the Hall effect device D of the present invention.

Consequently, when the magnetic flux density increases and the internal resistance of the Hall effect device D increases, the internal resistance of the magnetoresistance device 16 also increases. Therefore, since the negative feedback voltage drops due to increased internal resistance of the magnetoresistance device, when the magnetic flux density is large, attenuation of output voltage $VH_2$ impressed on the amplifier is limited.

On the other hand, when the magnetic flux density decreases and the internal resistance of the Hall effect device D decreases , the internal resistance of the magnetoresistance device 16 also decreases. Therefore, the negative feedback voltage increases and the attenuation of the output voltage $VH_2$ impressed on the amplifier becomes greater.

In the present embodiment, as a consequence, increase in the internal resistance of the Hall effect device D, when the magnetic flux density increases, is compensated for by lesser attenuation of the output voltage $VH_2$ impressed on the implifier. On the other hand, decrease in the internal resistance of the Hall effect device D, when the magnetic flux density decreases, is compensated for by greater attenuation of the output voltage $VH_2$ impressed on the amplifier. By these means, the characteristics of the practically usable output voltage taken out of the amplifier are improved so as to become proportional to the magnetic flux density.

In the foregoing, since the output voltage of the Hall effect device is, as aforementioned in equation (6), in the $$VH_2 = i_1 B^2 K_1 K_2$$

relation to the magnetic flux density, the non-linear characteristic arising from the saturation characteristic of the amplifier is improved to become linear by the negative feedback.

The present embodiment of application, in other words, provides a labyrinth characteristic to the output voltage characteristics of the Hall effect device D with the magnetic induction through the use of the magnetoresistance device 16, which changes in resistance value according to the magnetic flux density, for the feedback resistor of the amplifier system.

In the present embodiment of application, the magnetoresistance device connected to the positive input terminal of the negative feedback circuit has been shown. However according to the present invention, connection of the device is not limited to the above. The magnetoresistance device may, as shown in FIG. 6, also be connected between the negative input terminal and the ground of the negative feedback circuit. In other words, common techniques may be used for the connection mode of these negative feedback resistors.

As can be seen from the foregoing embodiments, the Hall effect device according to the present invention is capable of obtaining an output voltage having nth power characteristics relative to the magnetic flux density with a discrete device and is highly advantageous when used for various measuring instruments and arithmetic units. Also, in case means of compensation, such as exemplified in FIGS. 3, 4, 5 and 6, are added, it provides advantages of effectively achieving improvement of output voltage characteristics.

FIG. 7 illustrates another temperature compensated Hall device embodying features of the invention. Here is a circuit corresponding to that of FIGS. 2 and 3, temperature compensating thermistors 127 are connected in series with the resistors $r_2 \ldots, r_n$ and with the source V. Each thermistor has a temperature characteristic $P=e^{-T}$ opposite to the temperature characteristic of the Hall generator section.

It should be understood, of course, that the present invention is not to be limited to the foregoing disclosure but that it is intended to cover all charges and modifications of examples of the invention herein chosen for the purpose of disclosure, which do not constitute departures from the spirit and scope of the invention as set forth in the appended claims.

What is claimed is:

1. A device for producing a signal comprising first Hall generator means having two input means and two output means, second Hall generator means having two input means and two output means, one of said output means of said first Hall generator means forming one of the input means of said second Hall generator means, electrical means connecting the other output means of said first hall generator means to the other of said input means of said second Hall generator means, both of said Hall generator means together forming a single integral structure.

2. A device as in claim 1, wherein each of said Hall generator means includes a Hall material and the Hall material of said second Hall generator means is an extension of the Hall material of said first Hall generator means at the one of said output means of said first Hall generator means.

3. A device as in claim 2, further comprising load means connected across said output means of said second Hall generator means and source means connected to the input means of said first Hall generator means, and magnetic field producing means located to subject each of said Hall generator means to the same magnetic field.

4. A device for producing a signal which is a function of the nth power of an applied magnetic field, comprising n successive Hall generator means each having first and second input means and first and second output means, said second output means of the first to (n—1)th Hall generator means forming the first input means of each of the successive ones of the second to nth Hall generator means, circuit means connecting each of said first output means of the respective first to (n—1)th Hall generator means to the second input means of each successive one of said second to nth Hall generator means, all of said Hall generator means together forming a single integral structure.

5. A device as in claim 4, wherein each successive Hall generator means is a continuation of the material of each preceding Hall generator means.

6. A device as in claim 4, wherein each of said second output means forms a terminal and each successive Hall generator means is an elongation of the terminal of the preceding Hall generator means.

7. A device as in claim 4, further comprising source means connected to the first and second input means of said first Hall generator means, load means connected to he first and second output means of said nth Hall generator means, and magnetic means subjecting each of said Hall generator means to the same magnetic field.

8. A device as in claim 4, further comprising thermistor means having a temperature characteristic opposite to the temperature characteristic of said Hall generator means and connected in series with one of said input means.

9. A device as in claim 8, wherein said thermistor means has a characteristic $P=e^{-n\alpha T}$ opposite to the temperature characteristic of said Hall generator means where P is the temperature characteristic of said thermistor means, e is the base of natural logarithms and $-\alpha T$ is the temperature coefficient of each individual one of said Hall generator means.

10. A device as in claim 9, wherein said thermistor means is connected in series with the input means of said first Hall generator means.

11. A device as in claim 4, further comprising a plurality of thermistor means each connected in series with one of said Hall generator means and having a temperature characteristic opposite to the temperature characteristic of said Hall generator means.

12. A device as in claim 11, wherein each of said thermistor means has a temperature characteristic $P=e^{-\alpha T}$, where P is the temperature characteristic of said thermistor means, e is the base of natural logarithms and $-\alpha T$ the temperature characteristic of each of said Hall generator means.

13. A device as in claim 1, wherein said electrical means includes additional Hall generator means connected in series between the other output means of said first Hall generator means and the other input means of said second Hall generator means and having output terminals, and magnetic resistance means connected between said output terminals and having the resistance that increases with increasing magnetic field so as to decrease the resistance of said additional Hall generator means.

14. A device as in claim 4, wherein one of said circuit means includes additional Hall generator means having input terminals connected between one of said output means of one Hall generator means and an input means of the successive one of said Hall generator means, and magnetic resistance means connected between said output terminals and having a resistance that increases with increasing magnetic field so as to decrease the resistance of said additional Hall generator means.

15. A device as in claim 4, further comprising amplifier means connected across said output means of said nth Hall generator means and magnetic resistance means forming a negative feedback path at said amplifier means, said magnetic resistance means increasing in resistance in response to an increase in the magnitude of a magnetic field applied thereto so as to decrease the negative feedback and hence increase the amplification in response to increases in the magnetic field.

16. A device as in claim 4, further comprising load circuit means connected across said output means of said nth Hall generator means, said load circuit means including amplifier means, magnetic resistance means in negative feedback relation with said amplifier means for increasing and the feedback with low resistance and for decreasing the feedback with high resistance, said magnetic resistance means increasing in resistance in response to an increase in the applied magnetic field.

17. A device in claim 4, further comprising load circuit means connected to the output means of said nth Hall generator means, said load circuit means having amplifier means and magnetic resistance means connected in feedback relation with said amplifier means to increase the amplification in response to increases of resistance of said magnetic resistance means, said magnetic resistance means increasing in resistance in response to increases in the applied magnetic field.

18. A device as in claim 4, wherein each of said Hall generator means is composed of the same material as each of the other Hall generator means an is continuously and homogenously joined therewith, said Hall generator means having substantially equal Hall effect characteristics, each successive Hall generator means extending transversely from near the mid point of the preceding Hall generator means and being elongated and having said input means at the ends thereof and said output means near the mid points of the sides thereof.

* * * * *